United States Patent [19]

Rasbury

[11] Patent Number: 4,733,255

[45] Date of Patent: Mar. 22, 1988

[54] DIELECTRIC COATING FOR RECORDING MEMBER

[75] Inventor: Vincent K. Rasbury, Woodbury, Minn.

[73] Assignee: Minnesota Mining and Manufacturing Company, St. Paul, Minn.

[21] Appl. No.: 858,970

[22] Filed: May 1, 1986

[51] Int. Cl.⁴ .............................................. G01D 15/10
[52] U.S. Cl. ................................. 346/153.1; 346/160.1
[58] Field of Search .................. 346/153.1, 155, 150, 346/74, 135.1, 136, 160.1; 358/300; 101/DIG. 13; 400/119

[56] References Cited

U.S. PATENT DOCUMENTS

| 3,245,833 | 4/1966 | Trevoy | 117/201 |
| 3,816,840 | 6/1974 | Kotz | 346/74 |
| 3,847,606 | 11/1974 | Schwartz et al. | 96/1.5 |
| 3,912,511 | 10/1975 | Gerace et al. | 96/1.5 |
| 3,946,402 | 3/1976 | Lunde | 346/74 |
| 4,402,000 | 8/1983 | Fabel et al. | 346/155 |

Primary Examiner—Arthur G. Evans
Attorney, Agent, or Firm—Donald M. Sell; James A. Smith; David L. Weinstein

[57] ABSTRACT

A recording member comprising a conductive substrate having a dielectric coating thereon. The recording member is particularly useful with the electrographic recording process and apparatus described in U.S. Pat. No. 3,816,840. The dielectric coating exhibits charge dissipation properties that will allow removal and replacement of toner powder within one operating cycle of the aformentioned recording process, and the surface of the coating is sufficiently durable to allow the recording member to be used repeatedly, e.g., at least about 20,000 cycles, before the conductive substrate needs to be recoated.

14 Claims, 3 Drawing Figures

DIELECTRIC COATING FOR RECORDING MEMBER

BACKGROUND OF THE INVENTION

1. Field of the Invention

The present invention relates to a recording member for the electrographic recording of toner images thereon and to a coating for the recording member, which coating provides the member with electrical, optical, and durability characteristics useful for the recording process.

2. Description of the Prior Art

Kotz, U.S. Pat. No. 3,816,840 discloses an electrographic recording process and apparatus in which a dielectric recording member is arranged between two electrodes. Magnetically adhered to one of the electrodes is electronically conductive toner powder. The toner powder provides an electrically conductive path between the electrode to which it is bound and the adjacent surface of the dielectric member. A voltage is applied to the electrodes for a time and of a magnitude sufficient to generate a force pattern on the toner which enables toner deposition on the recording member in accordance with the force pattern. The force pattern is generated directly on the toner rather than on the recording member, which is passive in the operation of the apparatus disclosed in the patent.

For certain purposes in the practice of the recording process disclosed in U.S. Pat. No. 3,816,840, it is desirable that charge leakage from the recording member be such that a controlled amount of charge is dissipated from the toner deposited thereon, for example, from electrically charged toner applied uniformly to the recording member from an applicator member such as described in U.S. Pat. No. 4,402,000. One benefit of such controlled charge leakage is that the recording member can be re-imaged with no observation of a residue of a previous image pattern that will interfere with the new image on the recording member.

Resistance to mechanical damage, abrasion, and wear are important characteristics for the receptor surface of a recording member employed in a process where an appreciable number of images are required to be applied thereto and removed therefrom. These characteristics of durability can be judged by subjecting a receptor surface to repeated cycles of the process and observing the images produced for signs of catastrophic failure or gradual deterioration. The number of cycles completed while retaining the ability to produce images meeting the acceptance criteria is a measure of the surface's durability.

It is often desirable to apply the toner to a dielectric recording member which has a background color which offers high contrast to the toner powder. For example, if the contrast between toner powder and the recording member to which it is applied were sufficiently high, e.g. 0.6 optical density units, the recorded information could be read directly or indirectly, or even copied by optical means, all with high fidelity and high resolution. Then, the untransferred, unfixed toner powder could be removed form the recording member and new information could be displayed thereon. A system employing a recyclable toner powder could then be designed to optimize the quality of the displayed image without regard to its transfer and fixing properties, or to the cost of depleting the toner powder with each copy. Alternatively, the toner powder could be fixed to the recording member if so desired.

Anodized aluminum has been used as a recording member for the electrographic recording apparatus described herein. An aluminum oxide surface that has the appropriate electrical response can be formed on an aluminum substrate by anodization or other conventional means. However, it is well known that such surfaces change over time, particularly when subjected to environments having high relative humidity. This change may adversely affect the electrical characteristics of the aluminum oxide surface. Furthermore, in environments of high relative humidity, aluminum oxide surfaces tend to collect a film of moisture that must be removed by special means to assure a stable electrographic process. Finally, anodized aluminum and other such surfaces do not have the optical properties desirable for certain desirable applications of the process disclosed in the Kotz patent.

A receptor surface for a dielectric recording member, which surface will exhibit sufficient conductivity for the electrographic process, can be prepared by incorporating ionic materials in a dielectric organic resin, such as polyester resin; however, if the desired conductivity is dependent upon the presence of sufficient moisture to cause ionic movement and charge transfer, such a receptor surface will not perform satisfactorily in an environment of low relative humidity.

Other materials for a receptor surface which have appropriate electrical characteristics for use in a rapid cycle electrographic recording process generally are unable to withstand the mechanical abuse resulting from flexing, cycling, and the application and removal of toner powder.

A coating formed from polyester film and bearing an appropriate pigment can provide the desired contrast between recording member and toner powder. However, a polyester film, or a film prepared from another dielectric organic resin, when applied to a conductive grounding surface, will generally not allow charge to flow through it or leak from its surface fast enough to allow removal of one image from the surface of the film and replacement with another image during a commercially acceptable cycle of the electrographic recording device.

Thus, it can be seen that selection of a recording member and dielectric coating thereof for use with a recyclable imaging power may be constrained by at least four factors:

(1) Electrical properties of the recording member must allow balance between dielectric properties and sufficient charge leakage from the toner so that the toner can be imagewise deposited and thereafter removed from the recording member surface within certain predetermined times (or equivalent distances), such as between an applicator member and the styli array, and/or removal of and replacement of toner powder within one operating cycle of the process;

(2) The aforementioned electrical properties must not vary greatly over a broad range of temperature and humidity;

(3) Durability properties of the recording member must be sufficient in order to allow the process to be economically feasible;

(4) Contrast between the toner powder and the recording member can be specified to be high, e.g. at least 0.6 optical density units.

Although it is relatively simple to provide a recording member that fulfills any one of the four foregoing constraints, satisfaction of all four of them simultaneously has heretofore proved to be extremely difficult.

SUMMARY OF THE INVENTION

This invention involves a recording member suitable for use with the electrographic recording process and apparatus described in Kotz, U.S. Pat. No. 3,816,840. The recording member comprises a conductive substrate having a dielectric coating thereon. The dielectric coating is formed from a polymeric material containing a metal complex. The concentration of metal complex should be sufficiently high to prevent excessive charge build-up on the dielectric coating but sufficiently low to provide images of sufficient optical density. The substrate can be formed of any conductive material, e.g. metals, photoconductive materials.

The recording member exhibits charge dissipation properties that will allow removal and replacement of toner powder within one operating cycle of the electrographic recording process described in the aforementioned Kotz patent, e.g. a time period of 2 milliseconds. The surface of the dielectric coating is sufficiently durable to allow the recording member to be used repeatedly before the conductive substrate needs to be recoated, e.g. the coating is able to withstand at least 100,000 cycles of image formation with toner powder and removal thereof. The dielectric coating preferably provides high contrast between toner powder and the recording member, e.g. at least 0.6 optical density units, thus allowing an image formed by said toner powder particles to be read and/or copied by optical means, e.g., cameras, photocells, projection onto a recording surface, while retaining high fidelity and high resolution on the reading surface and/or on copies prepared therefrom.

DETAILED DESCRIPTION

Figure 1:
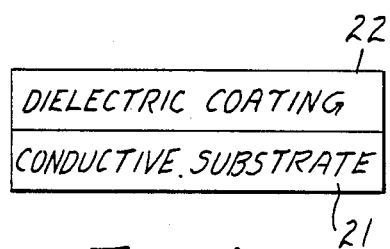
FIG. 1 is a schematic view of one embodiment of the recording member of the present invention.
Figure 2:
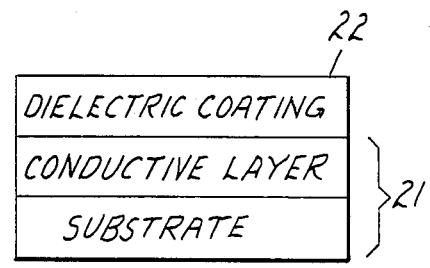
FIG. 2 is a schematic view of another embodiment of the recording member of the present invention.

FIGS. 1 and 2 show alternate embodiments of the recording member of the present invention.

The electronic properties of the dielectric recording member affect the performance of the electrographic recording system described in the Kotz patent, and the limits placed on these properties depend on the specific embodiment. However, the limits in most cases arise from the following considerations.

The electronic capacity of the dielectric recording member must be low enough to allow, in the time interval for image development, sufficient toner potential build-up, and, consequently, sufficient force build-up on the toner positioned in electronic contact with the image receptive surface of the recording member. This capacity is determined by the dielectric constant and the size and configuration of the dielectric recording member with respect to other parts of the circuit. The capacity should be high enough to permit, in conjunction with the rest of the circuit elements, sufficient charge build-up on the external toner particles at the applied voltage chosen for operation.

The resistivity of the dielectric recording member should be sufficiently high to prevent so much charge from flowing off of the toner into the dielectric recording member at such a rate as to reduce the electrical force to a level insufficient to overcome the magnetic force in image areas. Preferably, its resistivity should be at least 10 times the resistivity of the toner at electric fields comparable to those experienced by the materials in the practice of the invention of U.S. Pat. No. 3,816,840, incorporated herein by reference. The value of resistivity can be determined with an ohmmeter wherein the ohmmeter is connected to two copper bars, both of which bars are placed in contact with the dielectric surface of the composite recording member.

For low voltage operation, which is desirable from an economic and reliability standpoint, it is desirable to have a high electronic capacity for the dielectric recording member. It is more advantageous to achieve this through thin dielectric recording members than through a large dielectric constant coupled with a thick dielectric recording member. The dielectric coating should be sufficiently thick to withstand the voltages applied during the process. A suitable thickness is at least $5 \times 10^{-6}$ centimeters (500 Angstroms). The thicker the dielectric coating is above the minimum thickness, the greater the voltage necessary to produce a given force for the same dielectric constant. In general, for practical reasons, the thickness of the dielectric coating is kept to a minimum above that at which electrical breakdown would occur, because thicker dielectric coatings result in reduced resolution of the developed pattern.

From the foregoing discussion of limits on electronic properties, it is apparent that thickness of the dielectric coating can have a significant effect on the electrographic recording process. The coating thickness can range from about 0.05 to about 5.0 micrometers, preferably from about 0.3 to about 2.0 micrometers. Coatings having a thickness far in excess of 2.0 micrometers tend to exhibit poorer image resolution or background deposition of toner powder or to require undesirably high voltages, while coatings having a thickness far below 0.3 micrometers not only tend to lack sufficient durability for a recording member employed in a cyclic electrographic recording process wherein the surface is subjected to repetitive formation and removal of images, but also tend to result in formation of poor images.

The desired charge/discharge characteristics of an image receptive surface useful in a cyclic embodiment of the electrographic recording process of U.S. Pat. No. 3,816,840 can be defined by a time constant. A time constant is descriptive of the time rate of charge dissipation, that is, the capability of the recording member to support charge, yet allow leakage of the charge, i.e., discharge, to a level consistent with the requirements for cleaning the surface and making it suitable for re-imaging within one cycle of the electrographic recording process.

The rate of charge dissipation, sometimes referred to as leakage rate, of a dielectric material, as described in this invention, can be expressed quantitatively by the following equation:

$$V = Ae^{-Bt} + Ce^{-Dt} + E$$

where

V repesents the voltage on the surface of the recording member;

t represents the time in seconds measured from the application of initial charge;

A, B, C, D, and E represent positive numbers that are determined empirically.

Physically, the time t, in seconds, for an initial amount of charge, Qi, stored on a parallel plate capacitor with the material in question as its dielectric to decay to 1/e of its initial charge, that is, to Qi/e, where e=2.718, the base of the natural logarithm system, is known as the time constant ($\tau$). For the dielectric materials suitable for this invention, time constants of the order of a print cycle period (i.e. the time interval from the printing of one image to the printing of a subsequent image) are contemplated. In certain embodiments, e.g. such as described in U.S. Pat. No. 4,402,000, the time constants contemplated are of the order of the period beginning with the application of toner to the recording member from the applicator roll and ending with the arrival of the toner at the styli array.

Representative examples of sets of values of A, B, C, D, and E are shown in the following Table:

TABLE I

| Sample no. | A | B | C | D | E |
|---|---|---|---|---|---|
| 1 | 4.9 | 0.1 | 0.6 | 0.04 | 9.4 |
| 2 | 10.2 | 0.45 | 7.8 | 0.05 | 2.4 |
| 3 | 4.3 | 2.0 | 2.2 | 0.18 | 0.03 |
| 4 | 1.6 | 1.0 | 1.5 | 0.08 | 0.00 |

The aforementioned values of A,B,C,D, and E are not intended to be limiting; it is to be understood that these values are merely exemplary.

In order to measure empirically the value of $\tau$, the dielectric coating (i.e. the image-receptive surface) is mounted on a conductive drum with its ground plane connected to a suitable ground. The surface is charged, for example, by rotating the drum so that the surface passes beneath a corona source directing charge onto it. By rapidly stopping the image-receptive surface beneath a surface potential measuring device, e.g. a Monroe Isoprobe Model 144 non-contracting electrostatic voltmeter, the change in surface potential as a function of elapsed time, can be observed. If the measuring device is connected to a plotting recorder, a curve representing measured potential at determined times is produced. Suitable values of $\tau$ can range from several milliseconds to several seconds.

Given a set of process parameters, e.g. stylus voltage, distance between applicator member and styli, printing speed, cycle time between image formation, toner resistivity, determining the time constant of an image-receptive surface, along with the establishment of the thickness of the dielectric coating, will indicate whether the image-receptive surface is useful for a system having the given parameters.

Typical ranges for parameters for dielectric coatings suitable for the present invention are as follows:
Stylus voltage: 5 to 40 V
Minimum cycle time between image formation: several milliseconds to several seconds
Toner resistivity: less than $10^{10}$ ohm-cm at an applied field of about 500 volts/cm
Thickness of dielectric coating: $5 \times 10^{-6}$ cm to $2 \times 10^{-4}$ cm
Time constant ($\tau$) of image-receptive surface: several milliseconds to several minutes Other features which may affect the electronic properties of the recording member are more fully described in U.S. Pat. No. 3,816,840.

Although many materials are known to exhibit suitable electronic properties for use in the process of the Kotz patent, relatively few exhibit durability properties and optical properties that render them useful for certain commercial applications, i.e. those to be viewed optically on the receptor.

It has been determined that a dielectric coating will exhibit the required level of durability if it exceeds 20,000 cycles of image formation and removal, preferably 100,000 cycles of image formation and removal before the coating has been sufficiently eroded to adversely affect the performance of the recording member. However, certain users of the recording member of this invention will not require a dielectric coating exhibiting even the lower level of durability.

The dielectric coating is preferably sufficiently low in reflection optical density so that sufficient contrast between the recording member and toner powder is assured. A suitable level of contrast is, for example, at least +0.6 optical density units. If the coating is transparent, the level of contrast between the toner powder and the material comprising the conductive substrate is, for example, at least +0.6 optical density units.

Polymeric materials that are suitable for preparing the dielectric coating of this invention are selected on the basis of the requirements of the specific application in which this recording member is to be used. Generally, the chief requirement is that the metal complex must readily dissolve in the polymer/solvent system, if a solvent is used to apply the polymer to the conductive layer, or the polymer itself, if no solvent is used. Other considerations include adhesion to the conductive layer, color or transparency, durability, tolerance of humidity extremes, and ease of handling. Representative examples of polymer classes that are useful include acrylic, polyester, polycarbonate, polyvinyl acetate, polyvinyl chloride, polyvinyl butyral, cellulose acetate, polyvinyl alcohol, polyacrylonitrile, epoxy resins, polyamide, polyvinylpyrrolidone, polyvinyl acetal, cellulose acetate butyrate, polystyrene/butadiene, polyimide, and ethyl cellulose. Other useful polymers are listed in Trevoy, U.S. Pat. No. 3,245,833, col. 4, lines 32-61, incorporated herein by reference.

Metal complexes that are suitable for preparing the dielectric coating should be conductive, and both soluble and compatible in the polymer/solvent system, if a solvent is used to apply the polymer to the conductive layer, or in the polymer itself, if no solvent is used. The complex should not react with the polymer or solvent (if used), it should not precipitate out of solution, and it should not migrate to the surface of the polymeric coating. Other considerations include color or transparency, stability, and ease of use. These considerations are generally determined by the actual application in which the recording member is to be used. Representative examples of metals that form appropriate complexes include silver and copper. An example of the materials that form complexes with these metals is the halides. Examples of other metal complexes contemplated for use in accordance with the invention include halides of bismuth, gold, indium, iridium, lead, nickel, palladium, rhenium, tin, tellurium and tungsten; cuprous, cupric and silver thiocyanates, and iodomercurates. An example of one way in which suitable complexes can be formed is the use of alkali metal halides or ammonium halides as complexing agents for silver halide or copper halide, as described in U.S. Pat. No. 3,245,833, incorporated herein by reference. In particular, see col. 3, line 65 through col. 4, line 31 and col. 5, lines 39–49 of that patent. The preferred metal complex is silver iodide, complexed with potassium iodide.

The concentration range of the complex in the finished dielectric coating is determined by the polymer and complex used and the application for the recording member. A preferred concentration range for the metal complex is from about 5% up to about 50% by weight, the more preferred range being about 15% to 30% by weight.

The composition for preparing the coating material is preferably prepared according to the following procedure:

Metal halide and a complexing agent are dispersed into a solution containing polymeric material dissolved in an organic solvent. The complex is thus rendered soluble in the polymeric solution. The solution is then coated onto the conductive layer, providing a layer of finely dispersed metal halide complex in the dielectric polymeric material.

In a coating containing a complex formed with silver iodide (AgI) and potassium iodide (KI) wherein excess KI is not washed out of the coating solution, moisture will be absorbed at high levels of humidity, possibly resulting in unacceptable changes in conductivity. Accordingly, it is preferred to remove excess KI from coatings containing an AgI/KI complex.

The conductive substrate can be formed of either a self-supporting conductive material or a layer of conductive material applied to a non-conductive supporting substrate such as, for example, a flexible belt made of a polymeric material, in which case, the recording member itself would be flexible. In an example of a self-supporting conductive material, as shown in FIG. 1, the conductive substrate can be a metal drum made of brass, aluminum, steel, or the like, having sufficient conductivity to fulfill the requirements of the electrical circuit of the recording system. The conductive substrate is in contact with ground to create a potential difference between the surface and ground plane. Alternatively, a layer of conductive material can be applied to the surface of non-conductive supporting substrate, e.g. a polymeric film, in which case, the conductive layer occupies an intermediate position between the polymeric film and the dielectric coating. This embodiment is shown in FIG. 2.

Materials suitable for the conductive layer include metallic foils or sheets, such as aluminum or copper, metallic coatings such as gold, or metals deposited by one of a number of means such as vapor, sputtering, or plasma deposition, and conductive metal oxide films such as indium tin oxide, which can be deposited by a number of means.

The conductive layer is required to exhibit sufficient conductivity so as to transport charge at a rate consistent with the desired application. It has been found that conductive layers exhibiting resistivity less than 5000 ohms per square, preferably less than 1000 ohms per square, are generally useful in most applications.

It is preferred that the conductivity of the conductive layer not decrease below the desired level with time or with exposure of the recording member to changing environmental conditions such as exposure to high or to low relative humidity.

In situations wherein visual display or optical projection of the toner image is contemplated, and the dielectric layer is transparent, the conductive layer should also exhibit the appropriate degree of transparency, reflectivity, or opacity for the desired effect.

When visual display or optical projection of the reflected toner image is contemplated, it is preferred that the recording member produce a non-specular rather than specular reflection. A non-specular background to the image simplifies the arrangement of optical elements used when optical projection is considered.

It is often preferred that any non-conductive supporting substrate of the recording member be a flexible polymeric film. The film is relatively inexpensive, it is easily coatable, and the resulting product can be converted into various shapes and sizes, e.g. an endless belt for use in an electrograhic recording system.

The polymeric film can be any material that has sufficient stability to undergo the processing steps required to fabricate the recording member and to function with acceptable durability and stability in the electrographic recording system. Among polymeric materials suitable for forming the polymeric film are polyesters, polyolefins, polyamides, polyimides and vinyls. Polyester films are preferred because they can be produced with smooth surfaces, are resistant to attack from solvents, are resistant to heat distortion, and have good physical properties such as good tensile strength. Representative examples of commercially available polyester films are various grades of Scotchpar ®, manufactured by Minnesota Mining and Manufacturing Company, various grades of Mylar ®, manufactured by DuPont de Nemours Corporation, and various grades of Melinex ®, manufactured by ICI.

Figure 3:
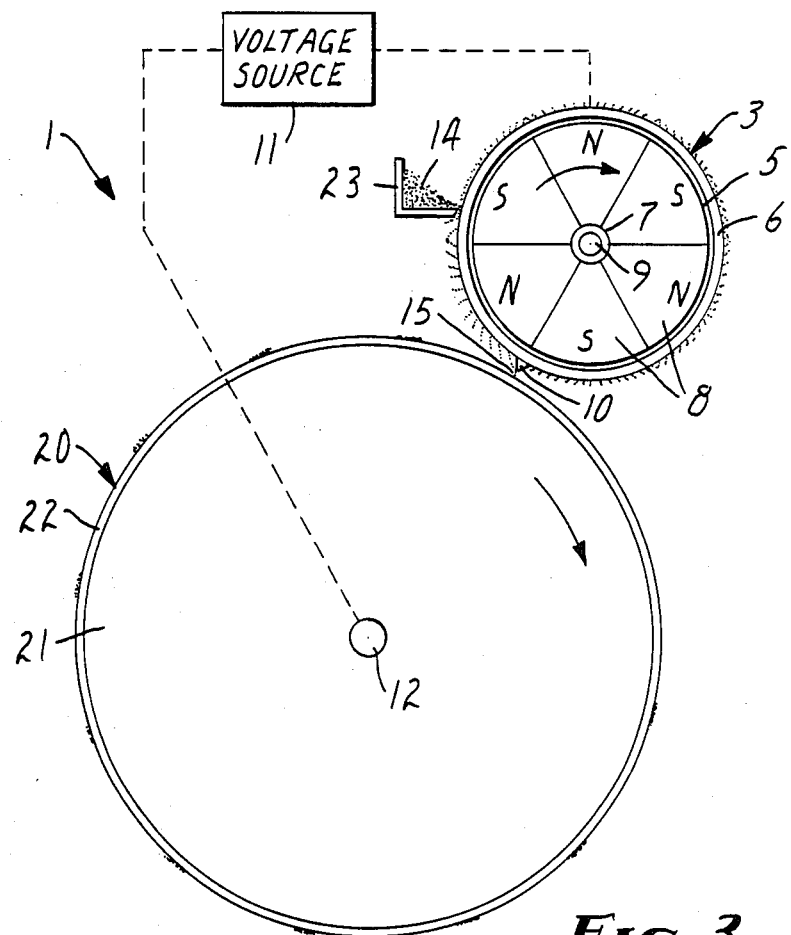
FIG. 3 is an end view of an electrographic recording system incorporating the recording member of the present invention.

Referring now to the drawings (and with specific reference first in FIG. 3) a recording system 1 employing the dielectric recording member of the present invention is shown. The recording system 1 includes a cylindrical developer roll 3 and a rotable recording member 20.

The developer roll 3 preferably is of the type such as disclosed in Anderson, U.S. Pat. No. 3,455,276, and has an inner magnet assembly 5 and an outer cyclindrical shell 6 that is electrically nonconductive and nonmagnetic. The magnetic assembly 5 includes a cylindrical, magnet support core 7 and a plurality of permanent magnet sectors 8 arranged about the cylindrical periphery of the core 7 to define a surface having alternate North and South magnetic poles. The developer roll 3 is mounted on an axle 9 and is constructed such that the magnet assembly 5 rotates in a clockwise direction, whereas the outer shell 6 is spaced from the magnet assembly 5 and is preferably fixed in position.

Arranged on a line that extends parallel with the support core 7 are a plurality of individual, spaced apart recording electrodes 10 (only one of which is shown) that protrude from the periphery of the shell 6, but may also be disposed in the shell 6 so that the outer ends of the electrodes 10 are flush with the periphery of the shell 6.

Each electrode 10 is magnetically permeable and passes a large amount of magnetic flux emanating from the magnet sectors 8 of the developer roll 3 so that the developer roll 3 serves as a force means for providing a relatively high magnetic flux density at the outer ends of the electrodes 10. Each electrode 10 is used to print a dot that has a definition defined by its shape, density and distribution of density, and the electrodes 10 are normally utilized to serve as a printing matrix. The number of electrodes 10 employed is dependent upon the printing application for which the matrix is to be used. In the case of a standard computer output line width of one hundred thirty-six, 5×7 dot matrix characters, nearly 1000 electrodes are employed, spaced at 70/inch. For more complex character fonts and simple graphic applications, electrode spacings of 100/inch to over 400/inch are required. A voltage source 11 supplies record voltage potential pulses to the electrodes 10 in a manner and for a purpose as will be described below.

The recording member 20 is mounted on an axle 12 that is parallel to the developer roll 3 and is rotably driven clockwise to rotate in the same direction as the developer roll magnet assembly 5. The member 20 is positioned in a spaced relationship with the electrodes 10 to define a narrow recording region 13 therebetween. Forming the member 20 are an electrically conductive cylindrical electrode 21 and an endless dielectric coating 22 that overlies the cylindrical surface of the electrode 21. Preferably, the electrode 21 is electrically grounded.

The voltage source 11 serves to provide voltage record pulses to the electrodes 10 to produce a potential difference between the electrodes 10 and the grounded electrode 13. Such potential difference results in toner deposition on the dielectric coating 22. The electrodes 10 are selectively pulsed by the source 11 to form toner images on the surface of the coating 22. The portion the toner 14 is that is deposited on the coating 22 in the form of toner images initially has a relatively high charge and is held on the coating 22 by the potential difference between the charged toner 14 and the grounded electrode 21.

The toner is preferably magnetically attractable and electronically conductive. A toner suitable for the apparatus described is disclosed in Nelson, U.S. Pat. No. 3,639,245.

A layer of magnetically attractable, electronically conducting toner 14 is metered onto the surface of electrode 10 by a doctor blade 23 which is extended in an axial direction but at a fixed space from electrode 10. The toner 14 is held and attracted to electrode 10 by the magnetic field exerted by magnet sectors 8. In this embodiment the magnet assembly 5 is arranged to rotate in a clockwise manner around its axis thus maintaining an effectively constant supply of toner 14 throughout the surface of electrode 10. Rotation of the magnet sectors 8 alone or together with the electrode 10 in either direction may also be done.

The following examples are meant to illustrate, but not limit this invention. Parts and percentages are by weight unless otherwise indicated.

EXAMPLE 1

The following ingredients, in the amounts, indicated, were used to prepare a composition for the surface coating of the recording member:

| Ingredient | Amount |
| --- | --- |
| Methyl ethyl ketone | 46.58 |
| Polymethyl methacrylate ("Acryloid" A-21, from Rohm and Haas) | 1.87 |
| Silver iodide | 0.62 |
| Hydrogen iodide (47% aqueous solution) | 0.93 |

Polymethyl methacrylate was added to methyl ethyl ketone and the dispersion mixed until a solution was formed. Silver iodide and hydrogen iodide were added, and the resulting mixture stirred until homogenous solution had formed. The solution was coated on a layer of indium tin-oxide that had previously been coated on white polyester. The coating was then dried at 220° F. for four minutes. The dry coating weight was 0.10 g/ft.$^2$.

The recording number was tested under the conditions described in U.S. Pat. No. 4,402,000, Example 1, incorporated herein by reference. The image density was measured with a Macbeth reflection densitometer using a visual filter. The value of Dmax was 0.78; the value of Dmin was 0.11.

EXAMPLE 2

| Ingredient | Amount |
| --- | --- |
| Methyl ethyl ketone | 94.59 |
| Polymethyl methacrylate ("Acryloid" A-21) | 3.75 |
| Silver iodide | 1.25 |
| Potassium iodide | 0.41 |

Polymethyl methacrylate was added to methyl ethyl ketone and the dispersion stirred until a solution was formed. Silver iodide and potassium iodide were then added and the resulting mixture was stirred until the AI and KI were dissolved. The solution was coated on a layer of indium tin-oxide that had previously been coated on white polyester. The coating was dried at 220° F. for 4 minutes. The coating weight was 0.1 g/ft$^2$.

The recording number was tested under the conditions described in U.S. Pat. No. 4,402,000, Example 1, incorporated herein by reference. The image density was measured with a Macbeth reflection densitomster using a visual filter. The value of Dmax was 1.01; the value of Dmin was 0.11.

Various modifications and alterations of this invention will become apparent to those skilled in the art without departing from the scope and spirit of this invention and it should be understood that this invention is not to be unduly limited to the illustrative embodiments set forth herein.

What is claimed is:

1. A recording member suitable for use in an electrographic recording system for recording toner images on a recording member, said system including first and second opposed electrodes spaced apart to define a recording region therebetween, means for driving the recording member through said recording region, and a means for transporting magnetically attractable, electronically conductive toner powder from a toner reservoir to said recording region to selectively deposit on said recording member in response to the selective application of voltage pulses across said electrodes, said recording member comprising a conductive substrate bearing a dielectric coating comprising a polymetric material containing a conductive metal complex therein wherein said metal complex is present in said dielectric coating an amount sufficient that the resistivity of the dielectric recording member is sufficiently high to prevent so much charge from flowing off the toner powder into the recording member at such a rate as to reduce the electrical force to a level insufficient to overcome the magnetic force in image areas.

2. A recording member according to claim 1 wherein said metal complex comprises a metal halide.

3. A recording member according to claim 2 wherein said metal complex comprises copper or silver.

4. A recording member according to claim 1 wherein said metal complex comprises copper or silver.

5. A recording member according to claim 1 wherein the metal complex comprises from about 5% up to about 50% by weight of the dielectric coating.

6. A recording member according to claim 1 wherein the metal complex comprises from about 15% up to about 30% by weight of the dielectric coating.

7. A recording member according to claim 1 wherein said member is sufficiently low in optical density so that the constrast between said recording member and said toner is at least 0.6 optical density units.

8. A recording member according to claim 1 wherein said conductive substrate is made from a conductive metal.

9. A recording member according to claim 1 wherein said conductive substrate comprises a conductive layer supported by a non-conductive insulatng substrate.

10. A recording member according to claim 1 wherein said electrically conductive substrate is transparent to visible light.

11. A recording member according to claim 1 wherein said dielectric coating is transparent to visible light.

12. A recording member according to claim 1 wherein the thickness of said dielectric coating is from about 0.05 micrometers to about 5.0 micrometers.

13. A recording member according to claim 1 wherein the thickness of said dielectric coating is from about 0.3 micrometers to about 2.0 micrometers.

14. A recording member according to claim 1 wherein said member is flexible.

* * * * *